Oct. 10, 1950    H. W. HAMMOND ET AL    2,524,973
EMERGENCY TRACTION ATTACHMENT
Filed Aug. 5, 1948
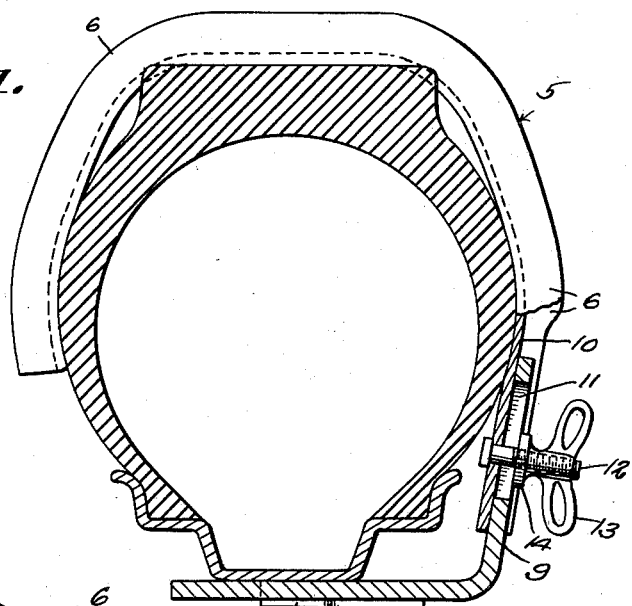
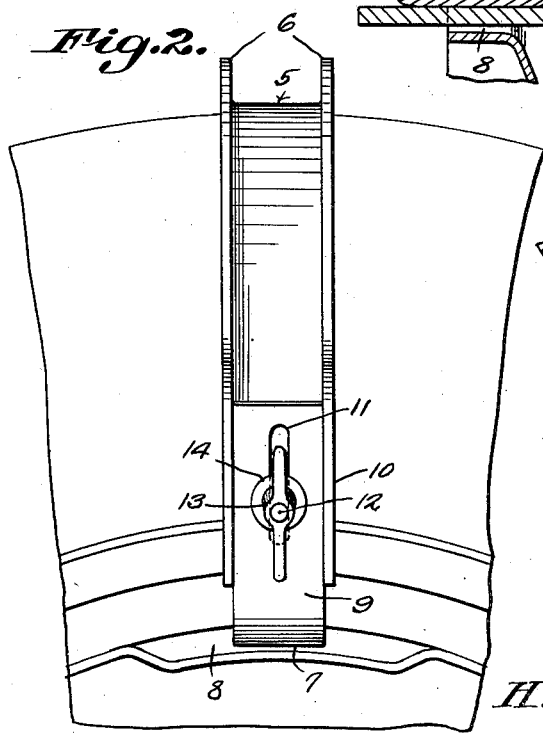
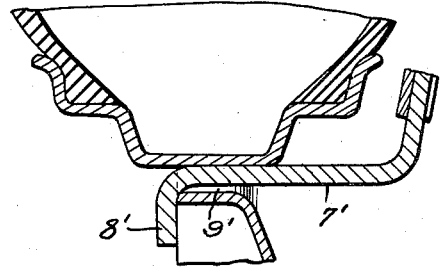
H. W. Hammond
R. W. Katz
INVENTORS.
BY *CA Snow & Co.*
ATTORNEYS.

Patented Oct. 10, 1950

2,524,973

UNITED STATES PATENT OFFICE 2,524,973

EMERGENCY TRACTION ATTACHMENT

Harold W. Hammond and Robert W. Katz,
Brookline, Mass.

Application August 5, 1948, Serial No. 42,584

1 Claim. (Cl. 152—228)

This invention relates to an emergency traction attachment designed for use in connection with motor vehicles, the primary object of the invention being to provide a traction device which may be carried in the delivery kit of a motor vehicle and readily and easily attached or detached from the wheel and tire, without the necessity of jacking up the tire or in any way altering the position of the wheel.

Another object of the invention is to provide a traction device of this character which may be adjustable for use in connection with tires of various sizes, and one which when positioned will hold its place on the tire against slipping when the wheel on which it is mounted rotates.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing:

Figure 1 is a sectional view through a tire equipped with a traction device constructed in accordance with the invention.

Fig. 2 is a side elevational view thereof.

Fig. 3 is a fragmental sectional view through a tire and rim, illustrating the modified form of holding device.

Referring to the drawing in detail, the device comprises the tread section 5 which is in the form of a curved bar having parallel flanges 6 formed thereon, the flanges providing biting edges that bite into the surface on which the wheel is supported, to increase the traction of the wheel.

The tread section is U-shape in formation and closely fits the outer surface of a tire shoe in such a way that the tread section will press into the rubber tread section of the tire in order to be properly positioned, holding the device against slipping on the tire shoe.

The traction device also includes the securing section 7 which is in the form of a bar of a width to fit within an opening 8 of the wheel in a manner as shown by Fig. 1 of the drawing, the securing section or bar having an angularly disposed end 9 of a length to extend into the space between the parallel flanges 6 of the traction device, at the long end 10 thereof.

The angularly disposed section 9 is provided with an elongated opening 11 in which the bolt 12 is disposed, the bolt 12 being mounted within an opening formed in the long end of the traction device. The wing nut 13 is positioned on the bolt and the flange 14 of the nut engages the outer surface of the angularly disposed portion 9 securing the tread section 5 and securing section 7 together. Due to this construction, it will be obvious that an attachment between the traction section 5 and securing section 7 may be made to adjust the device for positioning on tires of various sizes within certain limits.

As shown by Fig. 3 of the drawing, the securing section 7' has its free end 8' bent downwardly so that when the securing section 7' is positioned within the opening 9' of the wheel, the securing section will be securely held against outer movement providing an exceptionally secure structure.

From the foregoing it will be seen that due to the construction shown and described, I have provided a traction device which may be readily and easily mounted on a tire without the necessity of jacking up the wheel, removing the mud guard or splash guard of the fender, and one which will become automatically tightened on the wheel by the weight of the car exerting pressure thereon.

Having thus described the invention what is claimed is:

A traction device for vehicle wheels, comprising a substantially U-shaped tread section providing a long leg and a short leg, outwardly extended flanges formed along the edges of the tread section providing traction surfaces, said tread section adapted to fit over the tread of a tire with a portion thereof extended along the side wall of the tire, said long leg of the tread section having a bolt opening, a rigid securing section extended through an opening in the wheel on which the device is positioned, and angular upwardly extended end formed on the securing section, the outwardly extended end being of a width equal to the width of the space between the flanges, fitted between the flanges in contact therewith, said securing section having an elongated opening registering with the bolt opening, and a bolt extended through the registering openings adjustably connecting the sections of the device, and a wing nut on the bolt for drawing the sections together.

HAROLD W. HAMMOND.
ROBERT W. KATZ.

REFERENCES CITED

The following references are of record in the file of this patent:

UNITED STATES PATENTS

| Number | Name | Date |
|---|---|---|
| 1,779,689 | Bechtold | Oct. 28, 1930 |
| 1,869,298 | Borgstrom | July 26, 1932 |
| 2,108,346 | Paul | Feb. 15, 1938 |
| 2,381,639 | Bower | Aug. 7, 1945 |